(12) United States Patent
Ohtomo et al.

(10) Patent No.: US 8,630,755 B2
(45) Date of Patent: Jan. 14, 2014

(54) AUTOMATIC TAKING-OFF AND LANDING SYSTEM

(75) Inventors: Fumio Ohtomo, Tokyo-to (JP); Kazuki Osaragi, Tokyo-to (JP); Tetsuji Anai, Tokyo-to (JP); Hitoshi Otani, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 174 days.

(21) Appl. No.: 13/238,419

(22) Filed: Sep. 21, 2011

(65) Prior Publication Data
US 2012/0078451 A1 Mar. 29, 2012

(30) Foreign Application Priority Data
Sep. 28, 2010 (JP) ................................. 2010-216804

(51) Int. Cl.
G05D 1/10 (2006.01)
B64D 45/00 (2006.01)
G06F 19/00 (2011.01)

(52) U.S. Cl.
USPC ................................. 701/15; 701/16; 348/144

(58) Field of Classification Search
USPC .................... 701/15, 16, 3; 348/144; 340/959
See application file for complete search history.

(56) References Cited

U.S. PATENT DOCUMENTS

| | | | |
|---|---|---|---|
| 4,654,872 A | 3/1987 | Hisano et al. | |
| 4,858,157 A | 8/1989 | Murai et al. | |
| 5,072,396 A | 12/1991 | Fitzpatrick et al. | |
| 5,166,878 A | 11/1992 | Poelstra | |
| 5,262,856 A | 11/1993 | Lippman et al. | |
| 5,274,453 A | 12/1993 | Maeda | |
| 5,490,075 A | 2/1996 | Howard et al. | |
| 5,530,420 A | 6/1996 | Tsuchiya et al. | |
| 5,559,510 A | 9/1996 | Strong, III et al. | |
| 5,684,887 A | 11/1997 | Lee et al. | |
| 6,031,568 A | 2/2000 | Wakitani | |

(Continued)

FOREIGN PATENT DOCUMENTS

| EP | 1139062 A2 | 10/2001 |
|---|---|---|
| EP | 1158309 A2 | 11/2001 |

(Continued)

OTHER PUBLICATIONS

European Communication, transmitting Extended European Search Report, dated May 16, 2012 in co-pending European Patent Application No. EP 11195300.6.

(Continued)

*Primary Examiner* — Tan Q Nguyen
(74) *Attorney, Agent, or Firm* — Nields, Lemack & Frame, LLC (57) ABSTRACT

The invention provides an automatic taking-off and landing system, comprising a flying object and a taking-off and landing target, wherein the flying object has an image pickup device 21 for taking images found in downward direction, navigation means 4, 5, 6, 8, 9, 10 and 11, and a control unit for processing images acquired by the image pickup device and for controlling the navigation means, and wherein the control unit calculates a positional relation between the taking-off and landing target and the flying object based on the image of the taking-off and landing target as acquired by the image pickup device and controls taking-off and landing operations of the flying object based on a result of the calculation.

13 Claims, 6 Drawing Sheets

(56) References Cited

U.S. PATENT DOCUMENTS

| | | |
|---|---|---|
| 6,193,190 B1 | 2/2001 | Nance |
| 6,385,334 B1 | 5/2002 | Saneyoshi et al. |
| 6,626,078 B2 | 9/2003 | Thornton |
| 6,690,451 B1 | 2/2004 | Schubert |
| 7,010,401 B1 | 3/2006 | Richburg et al. |
| 7,050,909 B2 | 5/2006 | Nichols et al. |
| 7,242,817 B2 | 7/2007 | Takeda et al. |
| 7,391,340 B2 | 6/2008 | Malhomme |
| 7,552,025 B2 | 6/2009 | Ohtomo et al. |
| 7,755,513 B2 | 7/2010 | Wang et al. |
| 7,804,996 B2 | 9/2010 | Ohtomo et al. |
| 8,019,490 B2 | 9/2011 | Ferren et al. |
| 8,078,349 B1 | 12/2011 | Prada Gomez et al. |
| 2002/0001406 A1 | 1/2002 | Kochi et al. |
| 2002/0180636 A1 | 12/2002 | Lin et al. |
| 2002/0180870 A1 | 12/2002 | Chen |
| 2002/0191837 A1 | 12/2002 | Takeda et al. |
| 2004/0076340 A1 | 4/2004 | Nielsen |
| 2004/0105493 A1 | 6/2004 | Kondo et al. |
| 2004/0105579 A1 | 6/2004 | Ishii et al. |
| 2004/0125984 A1 | 7/2004 | Ito et al. |
| 2005/0084975 A1 | 4/2005 | Armentrout et al. |
| 2005/0125142 A1* | 6/2005 | Yamane ............ 701/200 |
| 2005/0165517 A1 | 7/2005 | Reich |
| 2006/0138277 A1 | 6/2006 | Franceschini et al. |
| 2007/0081695 A1 | 4/2007 | Foxlin et al. |
| 2008/0071431 A1* | 3/2008 | Dockter et al. ............ 701/3 |
| 2011/0196598 A1 | 8/2011 | Feyereisen et al. |
| 2011/0307126 A1* | 12/2011 | Hogstrom ............ 701/16 |
| 2012/0130566 A1* | 5/2012 | Anderson ............ 701/16 |
| 2012/0136513 A1* | 5/2012 | Hamburg ............ 701/3 |
| 2012/0158222 A1* | 6/2012 | Ehlin et al. ............ 701/16 |
| 2012/0173053 A1 | 7/2012 | Ohtomo et al. |
| 2012/0215388 A1 | 8/2012 | Pepitone et al. |
| 2012/0261516 A1 | 10/2012 | Gilliland et al. |
| 2012/0277934 A1 | 11/2012 | Ohtomo et al. |

FOREIGN PATENT DOCUMENTS

| | | |
|---|---|---|
| EP | 1378790 A2 | 1/2004 |
| JP | 5-24589 A | 2/1993 |
| JP | 2662111 B2 | 10/1997 |
| JP | 9-302628 A | 11/1997 |
| JP | 2000-85694 A | 3/2000 |
| JP | 2001-317915 A | 11/2001 |
| JP | 2004-245741 A | 9/2004 |
| JP | 2005-115623 A | 4/2005 |
| JP | 2006-10376 A | 1/2006 |
| JP | 2007-171048 A | 7/2007 |
| JP | 4253239 B2 | 4/2009 |
| KR | 691348 B1 | 3/2007 |
| WO | 02/082181 A1 | 10/2002 |
| WO | 2004/004320 A1 | 1/2004 |
| WO | 2004/084136 A1 | 9/2004 |

OTHER PUBLICATIONS

Extended European Search Report completed May 23, 2013 in co-pending European Patent Application No. EP 12165456.

Office Action mailed Jul. 30, 2013 in co-pending U.S. Appl. No. 13/314,509.

Office Action mailed Jul. 16, 2013 in co-pending U.S. Appl. No. 13/453,242.

Notice of Allowance mailed Oct. 31, 2013 in co-pending U.S. Appl. No. 13/314,509.

* cited by examiner

FIG.7 ics of image pickup device and with technical promotion to miniaturize devices and instruments, it is now possible to provide an image pickup device on a small type flying object and to perform the completely automated photographing from a position high up in the sky by remote control.

For instance, a small type flying object is taken off from a predetermined position (e.g. from a taking-off and landing deck) by remote control or according to a program incorporated in the small type flying object. Then, the small type flying object is flown in a predetermined range to take photographs. After the completion of the photographing, the flying object is operated to return to a preset position where taking-off and landing deck is placed, and further, the flying object is landed automatically on the taking-off and landing deck.

When a small type flying object is operated to take off, to fly and to land automatically, taking-off and landing is difficult to operate, in particular, it is difficult to make a small flying object land at a predetermined position. Therefore, to make the small flying object fly autonomously, it is necessary to establish a technique to perform automatic taking-off and landing in safe and reliable manner by simple control.

In the Japanese Patent Publication JP-A-2000-85694, a landing support system is disclosed, which describes an operation to perform landing of a small type flying object at a predetermined position. In the Japanese Patent Gazette No. 4253239, a navigation system is disclosed, which is used to accomplish landing of a helicopter at a point as desired according to image recognition. The Japanese Patent Gazette No. 2662111, an automatic landing guidance method is disclosed, which describes a procedure for guidance of vertical taking-off and landing operation by using a plurality of image sensors. Also, the Japanese Patent Publication JP-A-9-302628 discloses a movable type taking-off and landing facility for taking-off and landing operation of a small type flying object.

SUMMARY OF THE INVENTION

It is an object of the present invention to provide an automatic taking-off and landing system, by which it is possible to perform taking-off and landing operation in reliable and safe manner to make the flying object fly autonomously.

To attain the above object, the automatic taking-off and landing system according to the present invention, comprising a flying object and a taking-off and landing target, wherein the flying object has an image pickup device for taking images found in downward direction, navigation means, and a control unit for processing images acquired by the image pickup device and for controlling the navigation means, and wherein the control unit calculates a positional relation between the taking-off and landing target and the flying object based on the image of the taking-off and landing target as acquired by the image pickup device and controls taking-off and landing operations of the flying object based on a result of the calculation.

Also, the invention provides the automatic taking-off and landing system as described above, wherein the taking-off and landing target has a target mark, the control unit obtains a reference position of the target mark through image processing of the target mark taken by the image pickup device and guides taking-off and landing operations of the flying object based on a relation between the reference position of the target mark and a reference position of the flying object.

Further, the invention provides the automatic taking-off and landing system as described above, wherein the taking-off and landing target has a target mark, the control unit has a recognition pattern to recognize a target mark image, the control unit recognizes the target mark image based on the recognition pattern from the image taken by the image pickup device and guides the flying object so that the center of the target mark image will be the center of the image on the image.

Also, the invention provides the automatic taking-off and landing system as described above, wherein an altitude of the flying object is measured according to a size of the target mark image as recognized.

Further, the invention provides the automatic taking-off and landing system as described above, wherein a GPS device is provided on the flying object, the taking-off and landing target is disposed at a known position, the control unit determines a positional relation between a position of the flying object and a position of the taking-off and landing target based on a position of the flying object acquired by the GPS device and on the known position and controls the flight.

Also, the invention provides the automatic taking-off and landing system as described above, wherein a first GPS device is provided on the flying object, a second GPS device is provided on the taking-off and landing target, and the control unit determines a positional relation between a position of the flying object and a position of the taking-off and landing target based on a position of the flying object acquired by the first GPS device and on a position acquired by the second GPS device and controls the flight.

Further, the invention provides the automatic taking-off and landing system as described above, wherein a GPS device is provided on the flying object, the taking-off and landing target is disposed at a known position, the control unit determines a positional relation between a position of the flying object and a position of the taking-off and landing target based on a position of the flying object acquired by the GPS device and on the known position and controls the flight, and the control unit determines a reference position of the target mark through image processing of an image of a target mark taken by the image pickup device, and controls the taking-off and landing operation of the flying object based on a relation between the reference position of the target mark and a reference position of the flying object.

Also, the invention provides the automatic taking-off and landing system as described above, wherein the target mark has similar patterns disposed at concentric multiple positions, and at least one pattern can be recognized from an image acquired by the image pickup device in a process when the flying object lands on the taking-off and landing target.

Further, the invention provides the automatic taking-off and landing system as described above, wherein the taking-off and landing target has light-emitting means.

Also, the invention provides the automatic taking-off and landing system as described above, wherein the taking-off and landing target is provided on a mobile object.

Further, the invention provides the automatic taking-off and landing system as described above, wherein the taking-off and landing target is provided on a mobile object, the control unit determines a reference position of a target mark at real time through image processing of an image of the target mark taken by the image pickup device and controls flight of the flying object based on a relation between the reference position of the target mark and a reference position of the flying object so that the flying object tracks the mobile object.

Also, the invention provides the automatic taking-off and landing system as described above, wherein the taking-off and landing target is provided on a mobile object, the flying object has a first communication unit, the mobile object has a second communication unit, the second communication unit can transmit positional information acquired by the second GPS device to the control unit via the first communication unit, the control unit controls flight of the flying object based on a position acquired by the first GPS device and on a position acquired by the second GPS device so that the flying object tracks the track of the mobile object.

The invention provides the automatic taking-off and landing system as described above, comprising a flying object and a taking-off and landing target, wherein the flying object has an image pickup device for taking images found in downward direction, navigation means, and a control unit for processing images acquired by the image pickup device and for controlling the navigation means, and wherein the control unit calculates a positional relation between the taking-off and landing target and the flying object based on the image of the taking-off and landing target as acquired by the image pickup device and controls taking-off and landing operations of the flying object based on a result of the calculation. As a result, there is no need to have a special type of detecting device or the like for automatic landing and it is possible to guide the flying object in reliable manner to a target mark and to make the flying object land and it is possible to provide the taking-off and landing system which can be produced in simple manner and at lower cost.

Also, the invention provides the automatic taking-off and landing system as described above, wherein the taking-off and landing target has a target mark, the control unit obtains a reference position of the target mark through image processing of the target mark taken by the image pickup device and guides taking-off and landing operations of the flying object based on a relation between the reference position of the target mark and a reference position of the flying object. As a result, it is possible to perform the guidance of landing operation with high accuracy.

Further, the invention provides the automatic taking-off and landing system as described above, wherein a GPS device is provided on the flying object, the taking-off and landing target is disposed at a known position, the control unit determines a positional relation between a position of the flying object and a position of the taking-off and landing target based on a position of the flying object acquired by the GPS device and on the known position and controls the flight. As a result, autonomous (self-controlled) flight of the flying object can be accomplished in simple configuration.

Also, the invention provides the automatic taking-off and landing system as described above, wherein a first GPS device is provided on the flying object, a second GPS device is provided on the taking-off and landing target, and the control unit determines a positional relation between a position of the flying object and a position of the taking-off and landing target based on a position of the flying object acquired by the first GPS device and on a position acquired by the second GPS device and controls the flight. As a result, autonomous flight of the flying object can be accomplished in simple configuration.

Further, the invention provides the automatic taking-off and landing system as described above, wherein a GPS device is provided on the flying object, the taking-off and landing target is disposed at a known position, the control unit determines a positional relation between a position of the flying object and a position of the taking-off and landing target based on a position of the flying object acquired by the GPS device and on the known position and controls the flight, and the control unit determines a reference position of the target mark through image processing of an image of a target mark taken by the image pickup device, and controls the taking-off and landing operation of the flying object based on a relation between the reference position of the target mark and a reference position of the flying object. As a result, it is possible to ensure autonomous flight in flexible manner and to perform guidance for landing operation with high accuracy.

Also, the invention provides the automatic taking-off and landing system as described above, wherein the target mark has similar patterns disposed at concentric multiple positions, and at least one pattern can be recognized from an image acquired by the image pickup device in a process when the flying object lands on the taking-off and landing target. As a result, regardless of the altitude of the flying object and of field angle of the image pickup device, it is possible to perform guidance for landing operation by means of a target mark in reliable manner.

Further, the invention provides the automatic taking-off and landing system as described above, wherein the taking-off and landing target has light-emitting means. As a result, when the amount of light is not sufficient and it is difficult to recognize the target for the taking-off and landing operation, or even at nighttime, it is possible to perform guidance of the flying object for the landing in reliable manner.

Also, the invention provides the automatic taking-off and landing system as described above, wherein the taking-off and landing target is provided on a mobile object. As a result, the taking-off and landing operation of the flying object can be performed at any position as desired.

Further, the invention provides the automatic taking-off and landing system as described above, wherein the taking-off and landing target is provided on a mobile object, the control unit determines a reference position of a target mark at real time through image processing of an image of the target mark taken by the image pickup device and controls flight of the flying object based on a relation between the reference position of the target mark and a reference position of the flying object so that the flying object tracks the mobile object. As a result, it is possible to accomplish autonomous flight of the flying object in wider range.

Also, the invention provides the automatic taking-off and landing system as described above, wherein the taking-off and landing target is provided on a mobile object, the flying object has a first communication unit, the mobile object has a second communication unit, the second communication unit can transmit positional information acquired by the second GPS device to the control unit via the first communication unit, the control unit controls flight of the flying object based on a position acquired by the first GPS device and on a position acquired by the second GPS device so that the flying object tracks the track of the mobile object. As a result, it is possible to accomplish autonomous flight of the flying object in wider range.

DETAILED DESCRIPTION OF THE PREFERRED EMBODIMENTS

Description will be given below on embodiments of the present invention by referring to the attached drawings.

First, by referring to FIG. 1 and FIG. 2, description will be given on general features of an automatic taking-off and landing system according to the present invention.

Figure 1:
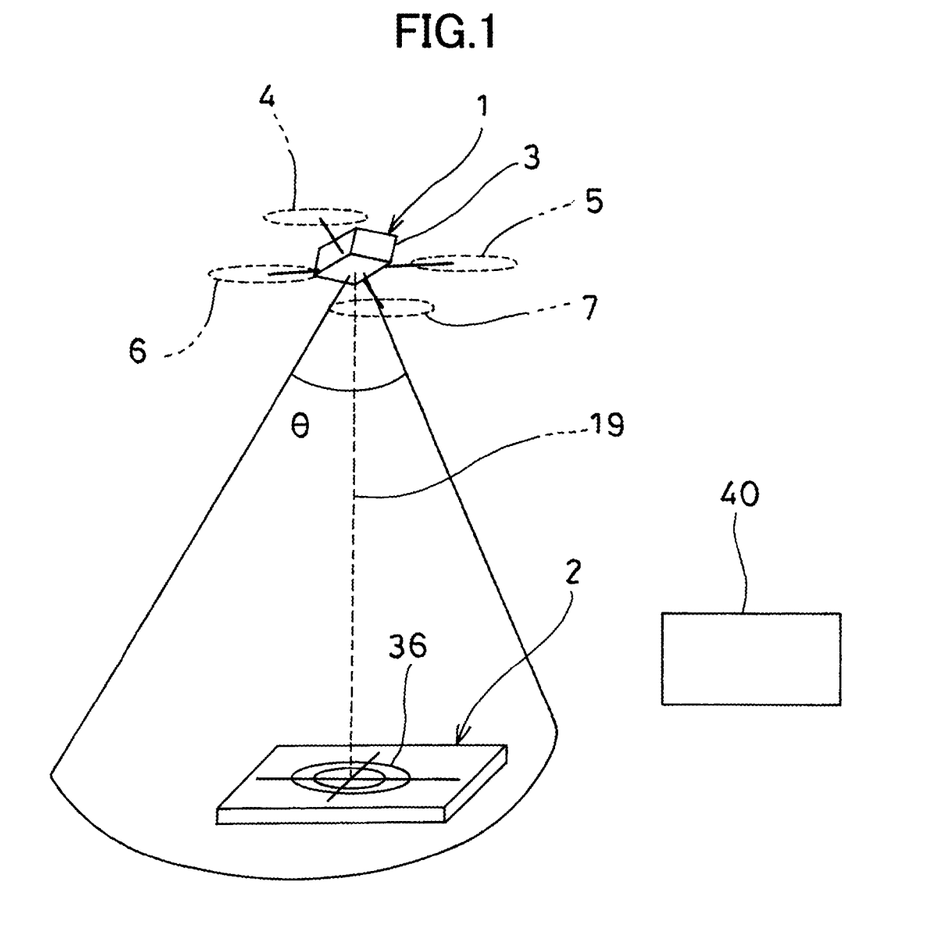
FIG. 1 is a schematical drawing to explain general features of the present invention.
Figure 2:
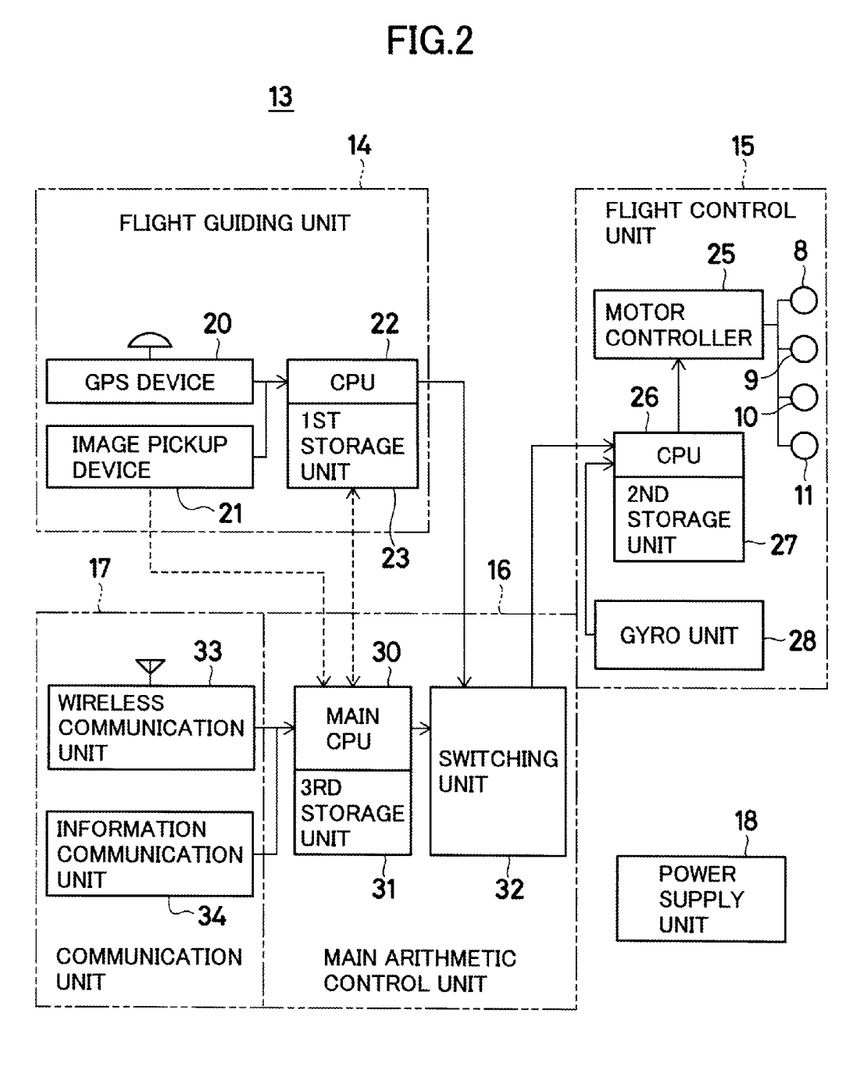
FIG. 2 is a schematical block diagram of an embodiment according to the present invention.

FIG. 1 shows a basic configuration of an automatic taking-off and landing system according to a first embodiment of the present invention. The automatic taking-off and landing system primarily comprises a flying object 1 and a taking-off and landing target 2 provided on a base station side. The flying object 1 is a helicopter, which executes an autonomous (self-controlled) flight as a small type flying object, for instance. Further, the helicopter 1 is designed so that it can be remotely controlled. In FIG. 1, numeral 40 represents a remote controller for remote control, for instance.

The helicopter 1 primarily comprises a helicopter body 3, propellers as required which are mounted on the helicopter body 3. For instance, there are provided four sets of propellers 4, 5, 6 and 7 on front, rear, left and right positions respectively. The propellers 4, 5, 6 and 7 are connected to a first motor 8, a second motor 9, a third motor 10, and a fourth motor 11 (to be described later) independently. Also, as described later, the driving of each of the first motor 8, the second motor 9, the third motor 10, and the fourth motor 11 are controlled independently from each other. The propellers 4, 5, 6 and 7 and the first motor 8, the second motor 9, the third motor 10, and the fourth motor 11, etc. make up together navigation means of the flying object.

On the helicopter body 3 of the helicopter 1, there is provided a control device 13. As shown in FIG. 2, the control device 13 primarily comprises a flight guiding unit 14, a flight control unit 15, a main arithmetic control unit 16, a communication unit 17, and a power supply unit 18.

The flight guiding unit 14 has a GPS device 20 as a position measuring device, an image pickup device 21, which is installed on an undersurface of the helicopter body 3, a flight guiding CPU 22 and a first storage unit 23. The image pickup device 21 is a digital camera or a video camera for taking digital images and takes images under the helicopter 1.

The GPS device 20 is designed so as to determine a reference position of the helicopter 1, for instance, a mechanical center. Because values measured by the GPS device 20 represent coordinates (position) of a geocentric coordinate system (absolute coordinates system), and the GPS device 20 determines the coordinates of the reference position on the geocentric coordinate system. Also, the image pickup device 21 has an optical axis 19, which passes through the reference position, and the optical axis 19 coincides with the vertical line when the helicopter 1 is at horizontal position. Therefore, the image pickup device 21 can acquire images within a field angle θ as required directly under the helicopter 1 (hereinafter referred as "background image"). Further, it is designed that the center of the background image coincides with the reference position.

The images acquired by the image pickup device 21 and positions and time, at which images have been acquired, are stored in the first storage unit 23, and the images, the positions and the time are associated. Further, flight planning data or the like to be used for performing autonomous flight are stored in the first storage unit 23. The images and the position, the time of the acquisition of the images may be stored in a third storage unit 31 as to be described later. In the first storage unit 23, a pattern for recognition is stored, which is used to recognize a pattern of a target mark 36 as to be described later. The pattern for recognition may be stored in the third storage unit 31 as to be described later.

In the first storage unit 23, various types of programs are stored. These programs include, for instance: an image processing program for image processing to extract the target mark 36 (to be described later) from images acquired at the image pickup device 21, a pattern recognition program for recognizing the target mark 36 by comparing the extracted target mark 36 with the pattern for recognition and for judging difference of direction between the target mark 36 and the pattern for recognition or the like, a flight guiding program for preparing flight guiding data from the flight planning data and from position information as measured by the GPS device 20, an image pickup control program for controlling pickup of images by the image pickup device 21, and other programs.

The flight control unit 15 comprises the first motor 8, the second motor 9, the third motor 10, and the fourth motor 11, and a motor controller 25 for driving and controlling these motors individually, and a flight control CPU 26 for controlling the motor controller 25, a second storage unit 27, and a gyro unit 28, which issues a posture status signal by detecting posture status of the helicopter 1 with respect to the horizontal position.

In the second storage unit 27, the following programs are stored: a flight control program for calculating flight conditions such as flying speed, ascending speed, descending speed, flying direction, flying altitude, etc. based on the flight guiding data from the flight guiding unit 14, a posture control program for calculating information for posture control based on the posture status signal from the gyro unit 28, and other programs. The flight control CPU 26 issues a flight control command to the motor controller 25 according to the flight control program, controls the first motor 8, the second motor 9, the third motor 10, and the fourth motor 11 via the motor controller 25, and executes the flight thus determined. Also, the flight control CPU 26 issues a posture control command to the motor controller 25 according to the posture control program, controls the first motor 8, the second motor 9, the third motor 10, and the fourth motor 11 via the motor controller 25, and controls the posture of the helicopter 1 in a condition as desired (e.g. in horizontal condition, i.e. a condition where the optical axis 19 of the image pickup device 21 runs in vertical direction).

The main arithmetic control unit 16 comprises a main CPU 30, a third storage unit 31, and a switching unit 32. In the third storage unit 31, the following programs are stored: a coordination program for coordinating and controlling the flight guiding unit 14 and the flight control unit 15, the image processing program for processing images acquired by the image pickup device 21, the flight control program, a communication control program, etc.

The communication unit 17 comprises a wireless communication unit 33, an information communication unit 34, etc. The wireless communication unit 33 receives a remote flight control command from a base station on the ground and sends communication on the flying condition of the helicopter 1 to the base station. Also, the information communication unit 34 gives and takes information between the base station and the helicopter 1 by using communication means such as wireless LAN or Bluetooth (registered trademark), etc. For instance, under conditions where the helicopter 1 is landed on the base station, the flight planning data are transmitted from the base station to the helicopter 1, or information such as image, position, time, etc., which have been taken during the flight, are transmitted from the helicopter 1 to the base station.

The power supply unit 18 is a rechargeable battery, for instance. Electric power is charged in the battery under conditions where the helicopter is landed at the base station, and electric power is supplied as necessary to the flight guiding unit 14, the flight control unit 15, the main arithmetic control unit 16, and the communication unit 17 during the flight.

Figure 3:
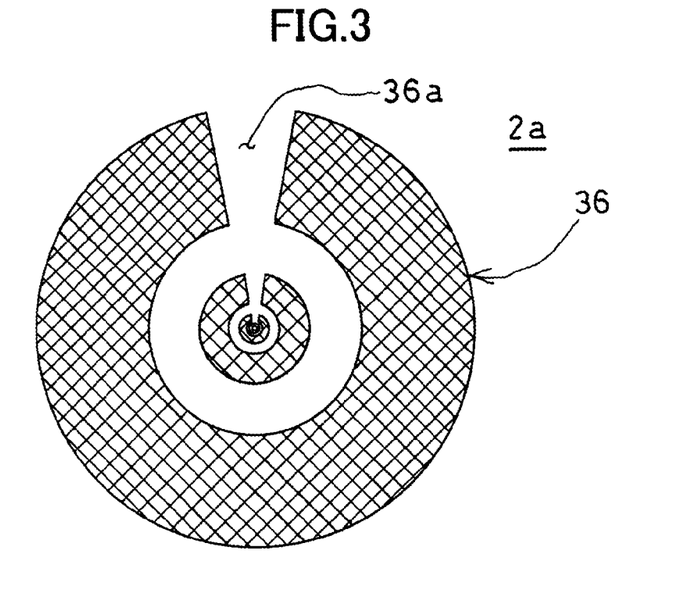
FIG. 3 is a drawing to show an example of a target mark to be used in the embodiment.

The taking-off and landing target 2 is installed at a known point. As shown in FIG. 3, the target mark 36 is marked on a surface, where the helicopter 1 is to be landed (hereinafter referred as "landing surface 2a", of the taking-off and landing target 2.

The target mark 36 is a mark where figures in similar shape (such as circular shape, rectangular shape, triangular shape, etc; circular shape is shown in the figure) are arranged in form of concentric multiple circles. The shape of the target mark 36 can be recognized from the helicopter 1 at any arbitrary altitude. Each of these shapes is in a known size. If the target mark 36 is designed in multiple circles, diameter of each of the circles has a known value. The target mark 36 has a reference position, and the reference position is the center of the figure, for instance.

Specifically, when the helicopter 1 is at the highest altitude or at a designated altitude at the time of landing and when the target mark 36 is within a range of a field angle θ of the image pickup unit 21, (preferably when the target mark 36 is positioned directly under or nearly directly under the helicopter 1), the image pickup device 21 can recognize at least the outermost pattern of the target mark 36. Also, at any altitude when the helicopter 1 is descended from the highest altitude or at a designated altitude and touches down the landing surface 2a, it is so designed that at least one of the patterns to constitute the target mark 36 can be perfectly recognized.

Therefore, under the condition where the image pickup device 21 touches down the ground, at least the innermost pattern, i.e. the smallest pattern, is included within the range of the field angle θ, and the innermost pattern is recognized by the image pickup device 21.

Further, the target mark 36 has a central marking to indicate the central position of the target mark 36, e.g. a dot mark or a cross mark. When the center of the pattern can be obtained according to the shape, the central marking can be omitted. The target mark 36 has a directional indexing portion 36a to indicate direction or a shape to indicate the direction. For instance, in the pattern as shown in FIG. 3, each of the circular shapes has a lacking portion as a directional indexing portion 36a on the same radius.

The image pickup device 21 to be installed on the helicopter body 3 is not limited to a device, which is used to acquire the images found in downward direction along the vertical line, but one or a plurality of image pickup devices can be provided. The other image pickup devices 21 are installed each at a predetermined angle with respect to the vertical line, and it may be so designed that the other image pickup device 21 may acquire images deviated in a direction running perpendicularly with respect to the advancing direction. The information collecting devices to be installed on board the helicopter 1 are not limited to the image pickup devices 21, and various types of devices such as distance measuring device, infrared image pickup device, etc. may be conceived.

Next, description will be given on operation according to the present embodiment.

First, description will be given on autonomous flight.

The main CPU 30 operates the switching unit 32 and sets up the switching unit 32 so that flight guiding data from the flight guiding unit 14 are inputted to the flight control unit 15.

With the helicopter in landed condition, flight planning data are transmitted to the control device 13 via the information communication unit 34, and the flight planning data are inputted to the first storage unit 23 via the main CPU 30. Also, positional data (absolute coordinates) of the taking-off and landing target are inputted. When all of the flight planning data are completely transmitted, autonomous flight is started based on the flight planning data.

Based on the inputted flight planning data, the flight guiding unit 14 prepares flight guiding data and inputs the flight guiding data to the flight control unit 15 via the switching unit 32. Then, based on the flight guiding data thus inputted, the flight control CPU 26 starts the flight by driving and controlling the first motor 8, the second motor 9, the third motor 10, and the fourth motor 11 via the motor controller 25. During the flight, positional information of the helicopter 1 is obtained from the GPS device 20. Then, based on the flight planning data and the positional information, the flight guiding CPU 22 corrects the flight guiding data as adequate and inputs the data to the flight control unit 15.

During the flight, the flight control CPU 26 controls the posture of the helicopter 1 by adequately driving and controlling the first motor 8, the second motor 9, the third motor 10, and the fourth motor 11 via the motor controller 25 based on the posture status signal from the gyro unit 28.

Also, during the flight, the flight guiding unit 14 executes operation as planned such as photographing, surveying etc. as necessary by controlling the image pickup device 21 based on the flight planning data.

When the scheduled operation has been completed, a return command is issued from the flight guiding unit 14. The helicopter 1 returns to the base station and is landed on the taking-off and landing target 2. Now, referring to FIG. 4, description will be given on the landing operation.

Figure 4:
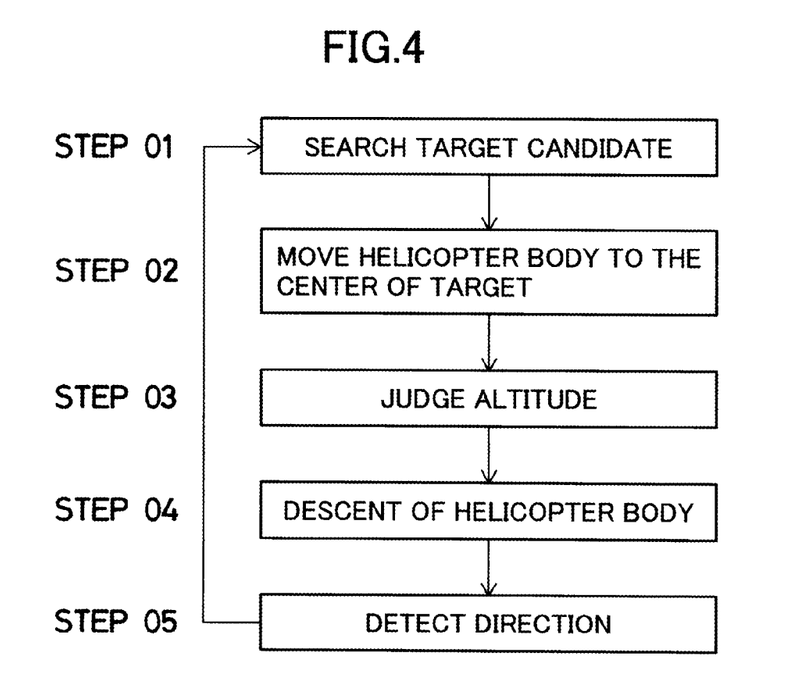
FIG. 4 is a flowchart to show operation during taking-off and landing operations in the present embodiment.

Based on the positional information acquired by the GPS device 20 and on the coordinates of the taking-off and landing target 2, the position of the helicopter 1 with respect to the taking-off and landing target 2 can be identified. Based on the position of the helicopter 1, the flight guiding unit 14 corrects the flight guiding data so as to guide the helicopter 1 to the base station and transmits the flight guiding data to the flight control unit 15 via the switching unit 32.

When the helicopter 1 arrives at a position in the sky above the taking-off and landing target 2, it is searched by image processing as to whether the taking-off and landing target 2 is included in the images taken by the image pickup device 21 or not (Step 01). Therefore, the relation between the accuracy of the measurement in the horizontal direction of the GPS device 20 and the field angle θ of the image pickup device 21 is the relation in such manner that at a position obtained based on the measurement result of the GPS device 20 and at a predetermined altitude (at an altitude where the landing operation is to be started), the image pickup device 21 can identify the taking-off and landing target 2 (i.e. the taking-off and landing target 2 is within a range of the field angle $\theta$).

The recognizing of the taking-off and landing target 2 means the recognizing of the target mark 36 concretely. The recognizing of the target mark 36 is carried out by pattern recognition based on comparison with the pattern of the target mark 36 stored in the first storage unit 23. When the target mark 36 is recognized, the guiding operation of the helicopter 1 is executed according to the recognition of the target mark 36.

Then, a deviation of the position of the center of the target mark 36 on background image (recognized by the pattern recognition) from the center of the background image is obtained. This deviation is reflected on the flight guidance data, and the helicopter 1 is guided in such manner that the center of the target mark 36 as recognized coincides with the center of the background image.

When the center of the target mark 36 coincides with the center of the background image, altitude is determined from the size of the image of the target mark 36. The altitude thus determined is reflected in the flight guidance data. When the center of the target mark 36 coincides with the center of the background image, the helicopter 1 is descended, and during the descending process, position control in the horizontal direction can be carried out with high accuracy by image processing of the target mark 36.

By performing edge processing on the image of the target mark 36, the size on the image, e.g. diameter, is measured. Actual dimension of the target mark 36 is already known and is stored in the first storage unit 23 in advance. Thus, by comparison with the dimension stored, a distance to the helicopter 1, i.e. an altitude, is determined. Further, in case the diameters (perpendicularly crossing each other) of the target mark 36 are not equal to each other, the circle is recognized as an ellipse. By a ratio of major axis to minor axis, deviation of angle and direction of deviation of the flying object with respect to the vertical line, which passes the reference position of the target mark 36, can be determined, and the position of the helicopter 1 can be corrected according to the deviation of angle and to the direction of deviation thus determined. It may be so designed that the center of the target mark 36 is detected, and that the position of the helicopter 1 may be corrected based on the deviation from the center of the background image (Step 02 and Step 03).

By continuously measuring the altitude and through differentiation by time, descending speed can be determined. Then, it is judged whether the descending speed coincides with the flight planning data or not. The flight guidance data based on this judgment are sent to the flight control unit 15. Based on the flight guidance data, the flight control CPU 26 drives and controls the first motor 8, the second motor 9, the third motor 10, and the fourth motor 11 via the motor controller 25, and the descending speed is controlled (Step 04 and Step 05).

During the descending operation, the target mark 36 is continuously recognized by image processing. By detecting a deviation of the center of the target mark 36 from the optical axis 19 of the image pickup device 21 (i.e. a deviation from the center of the background image), a positional relation between the target mark 36 and the helicopter body 3 in the horizontal direction can be determined with higher accuracy, and the helicopter 1 can be accurately landed at the center of the target mark 36.

During the landing process, from relation of the field angle $\theta$ of the image pickup device 21 and the size of the target mark 36, the target mark 36 goes gradually beyond the range of image pickup from the outer pattern of the target mark 36 while the altitude of the helicopter 1 is descending. As described above, in the target mark 36, similar patterns are arranged in concentric multiple circles. Thus, at any altitude during the process when the helicopter is going to touch the landing surface 2a, at least one of the patterns, which constitutes the target mark 36, can be perfectly recognized, and the continuity of the guidance by the target mark 36 can be ensured.

By the image processing of the target mark 36, the directional indexing portion 36a can be detected, and it is also possible to correct the direction of the helicopter body 3 with respect to the target mark 36.

As a result, the helicopter can be landed on the target mark 36 with high accuracy in the autonomous flight. The image pickup device 21 for acquiring the image to detect the target mark 36 can be commonly used as a device, by which aerial photograph is taken by the helicopter 1. Because final positioning is carried out by image processing of the taken target mark 36, the GPS device 20 provided on board the helicopter 1 need not be with high accuracy, and it may be a device less costly with measurement accuracy of about 10 meters, for instance.

Therefore, no specific device is needed for operating the automatic taking-off and landing system in the present embodiment, and the landing guidance with high accuracy can be accomplished by simple configuration and at lower cost.

In the embodiment as described above, if the burden on the flight guiding CPU 22 is heavy such as the case of image processing in the flight guiding unit 14, the burden of the processing may be shared by the main CPU 30, or the storage of the data and the program may be shared by the first storage unit 23 and the third storage unit 31.

In the description as given above, it may be so arranged that the coordinates of the target mark 36 is inputted as a part of the flight planning data, while it may be arranged so that the GPS device and the communication device are provided on the base station, and that the position of the target mark 36 is measured by the GPS device on the base station side, and also, that positional information of the target mark 36 may be transmitted to the communication unit 17 on the helicopter 1 side. The GPS device on the base station side may not necessarily be used to measure the position of the target mark 36, but it would suffice if the position (absolute coordinates) to be measured by the GPS device on the base station side may be in a known relation with the position of the target 36. With regard to the position of the taking-off and landing target 2 as acquired based on the measurement value of the GPS device on the base station side, when the target mark 36 is fixed, there is no change in the position of the target mark 36, and the position of the taking-off and landing target 2 may be inputted to the control device 13 as the flight planning data. In this case, the communication device on the base station side may be omitted.

When the helicopter 1 takes off, an operation procedure reverse to the operation procedure of the landing as described above is carried out. That is, under the condition that the image pickup device 21 can take the image of the target mark 36, the target mark 36 is recognized from the acquired image, and ascending speed and altitude are calculated and then, the ascending operation can be controlled. In case the helicopter 1 reaches a predetermined altitude, autonomous flight is executed based on the flight planning data, and also based on positional information acquired at the GPS device 20.

Next, description will be given on the flight of the helicopter 1 by remote control operation.

The switching unit 32 is operated via the main CPU 30, and the main arithmetic control unit 16 is connected with the flight control unit 15 so that the flight guiding data can be sent to the flight control unit 15 from the main arithmetic control unit 16.

A remote control signal is transmitted from the remote controller 40 on the base station side, and the remote control signal is received via the wireless communication unit 33. The main CPU 30 starts the flight control program, prepares the flight guiding data based on the remote operation signal, and inputs the flight guiding data to the flight control unit 15 via the switching unit 32.

The flight control CPU 26 controls the flight via the motor controller 25 based on the flight guiding data, and controls posture of the helicopter body 3 based on a posture status signal from the gyro unit 28.

In landing the helicopter 1, similarly to the case of autonomous flight, the image pickup device 21 takes the image of the target mark 36. Then, by the image processing on the target mark 36, positioning is carried out between the helicopter body 3 and the target mark 36. The image of the target mark 36 as taken by the image pickup device 21 is displayed on a display unit (not shown) of the remote controller 40, and the landing operation may be carried out by manual remote-control operation according to the image.

Figure 5:
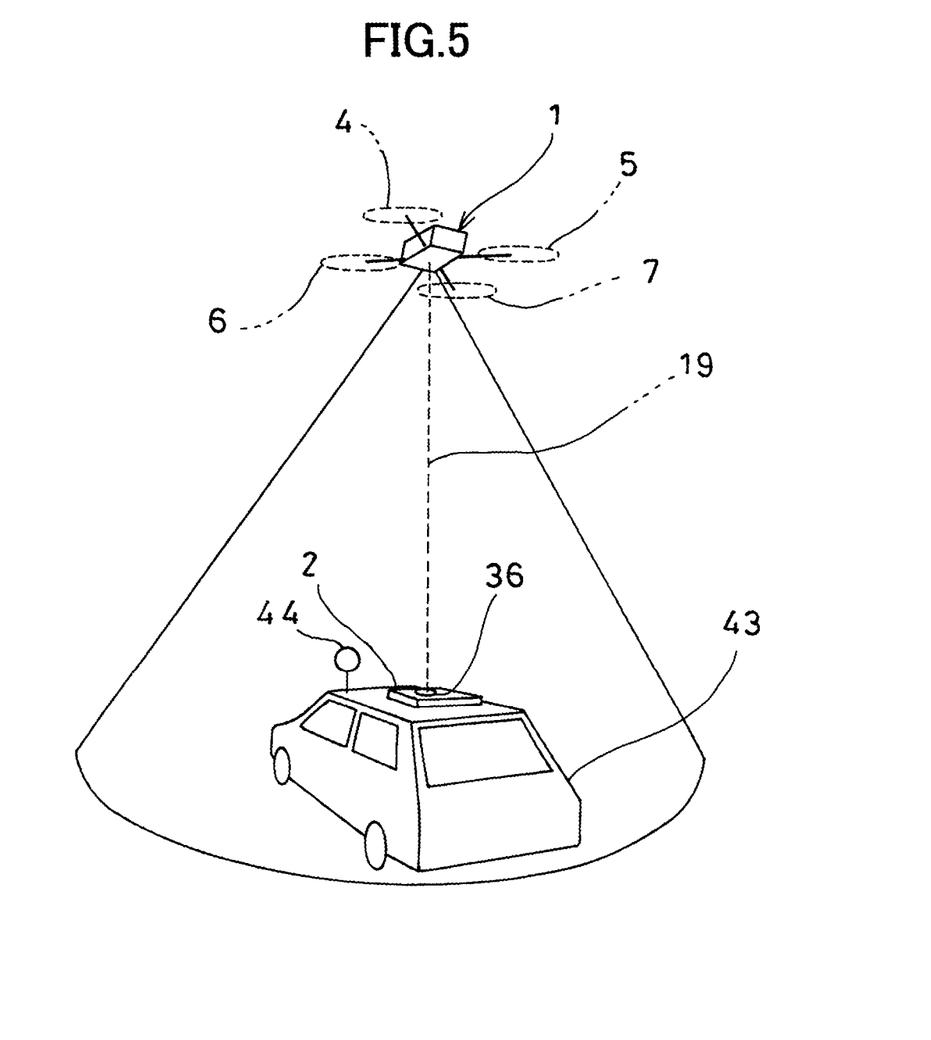
FIG. 5 is a schematical drawing to explain an application example of the present embodiment.

FIG. 5 shows an application example of the embodiment.

In this application example, the taking-off and landing target 2 is installed on a mobile object, e.g. on ceiling of an automobile 43, and a tracking system using the automatic taking-off and landing system is configured.

If the flight planing data is so designed that the helicopter 1 is positioned at all times directly above the target mark 36, the flight guiding unit 14 recognizes the target mark 36, and the flight guiding unit 14 calculates a deviation of the center of the target mark 36 from the optical axis 19 of the image pickup device 21 (i.e. the center of the background image). Then, the flight guiding data is prepared so that the center of the target mark 36 coincides with the optical axis 19 of the image pickup device 21, and the data are transmitted to the flight control unit 15. The flight control unit 15 controls the helicopter body 3 so that the helicopter body 3 is directly above the target mark 36 based on the flight guiding data, i.e. based on recognition of the position of the target mark 36 on the image.

When the automobile 43 is moved, the helicopter 1 is also moved to follow the movement of the target 36. Therefore, if the automobile 43 is moved along a route where information is required, information such as image data within the range where the automobile 43 is moved can be acquired.

In the application example, it is so arranged that a first GPS device 20 is provided on the helicopter 1, a second GPS device 44 is provided on the automobile 43, and a position of the automobile 43 (i.e. a position of the taking-off and landing target 2) is measured at real time by the GPS device 44. Then, the result of the measurement by the GPS device 44 is transmitted to the control device 13, and the control device 13 controls the flight of the helicopter 1 based on the result of the measurement by the GPS device 20 of the helicopter 1, and based on the result of the measurement by the GPS device 44. Further, in case the helicopter 1 is controlled to land on the taking-off and landing target 2, if it is so arranged that control is performed based on the image processing of the taken image of the target mark 36, it is possible to acquire images in wide range by the image pickup device 21 of the helicopter 1 or to acquire the measurement data in wide range by other measuring instrument which is installed on the helicopter body 3.

Figure 6:
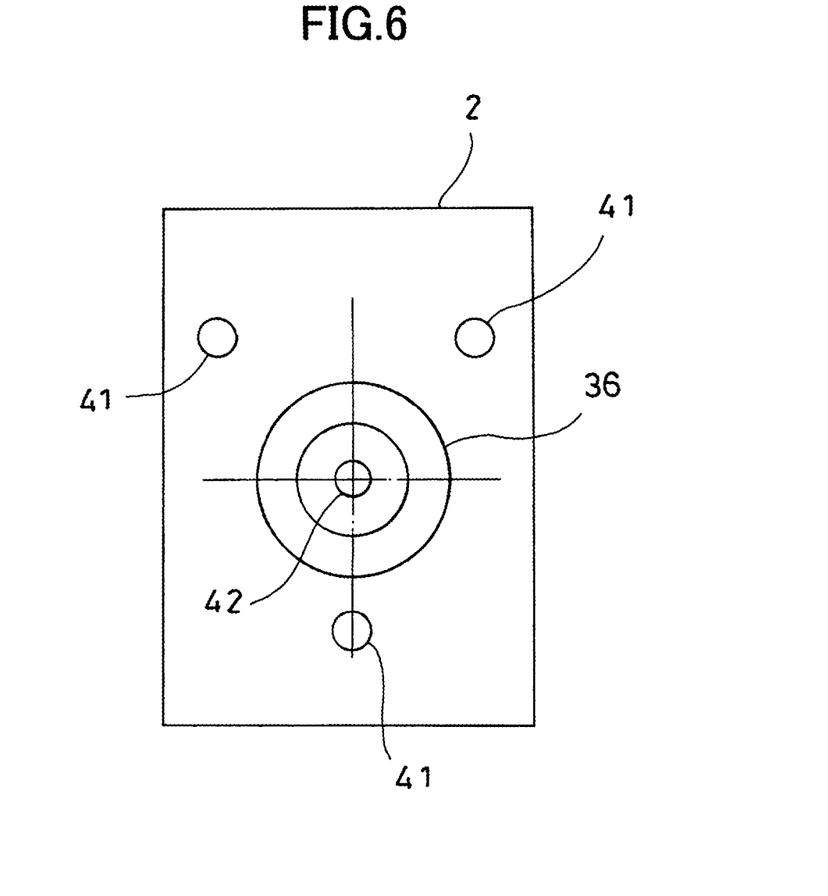
FIG. 6 is a schematical drawing to explain another example of the target.

FIG. 6 shows another example of the taking-off and landing target 2.

The taking-off and landing target 2 comprises a light emitting means, for instance, light-emitting diodes 41 and 42, in addition to the target mark 36.

The light-emitting diode 41 is disposed as many as required and at adequate arrangement at a position separated by a distance as necessary from the center. In the figure, an example is shown where the light-emitting diode 41 is disposed at a vertex of an isosceles triangle. Further, the light-emitting diode 42 is provided at the center of the taking-off and landing target 2. With the light-emitting diode 42 arranged at such position, the center of the target mark 36 can be detected immediately when the light-emitting diode 42 is detected. Accordingly, there is no need to obtain the center by calculation from the arrangement of the light-emitting diode 41. Many light-emitting diodes 41 may be arranged so that the light-emitting diodes 41 themselves form the target mark 36.

By providing the light-emitting diode 41, the taking-off and landing target 2 can be reliably recognized even under the condition that the amount of light is not sufficient to identify the target mark 36, e.g. when it is cloudy, or in the evening or at night, etc.

In case the light-emitting diodes 41 and 42 are provided, the target mark 36 may be omitted.

Figure 7:
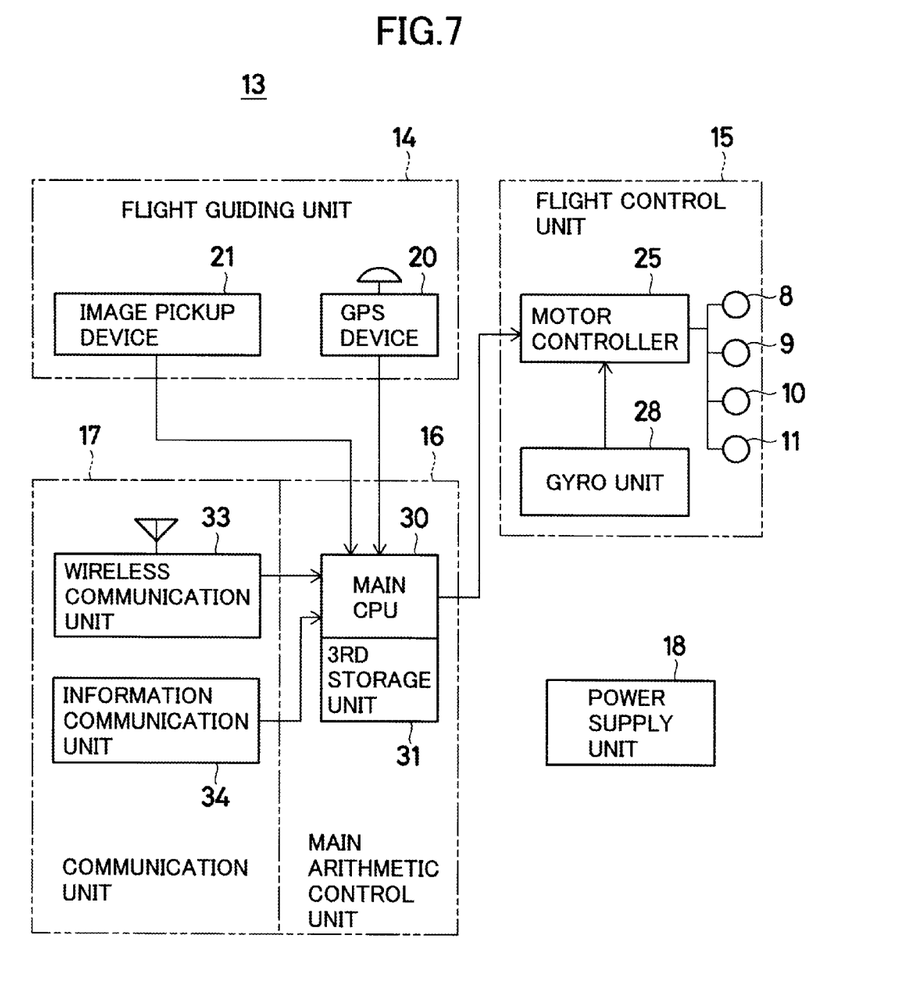
FIG. 7 is a schematical block diagram to show another embodiment of the present invention.

FIG. 7 shows another embodiment. In FIG. 7, the same component as shown in FIG. 2 is referred by the same symbol, and detailed description is not given here.

In this another embodiment, the flight guiding CPU 22 and the flight control CPU 26 of the above embodiment are put together in the main CPU 30, and a first storage unit 23 and a second storage unit 27 are put together in a third storage unit 31.

In this another embodiment, CPU's and the storage units are put together. As a result, it is possible to provide an automatic taking-off and landing system with simple configuration and in more convenient arrangement.

It is needless to say that the present invention can be applied for the purposes such as investigation of agricultural products, soil quantity control, construction work control, topographical investigation, investigations on buildings and constructions, investigations on electric power transmission towers, dams, and bridges, investigation on conditions of dangerous areas, monitoring and surveillance, etc.

The invention claimed is:

1. An automatic taking-off and landing system, comprising a flying object and a taking-off and landing target,
wherein said flying object has an image pickup device for taking images found in downward direction, navigation means, and a control unit for processing images acquired by said image pickup device and for controlling said navigation means,
said taking-off and landing target having a target mark in a known size,
said control unit having a recognition pattern in order to recognize target mark images,
wherein said control unit recognizes said target mark image based on said recognition pattern and based on images acquired by said image pickup device,
calculates a positional relation between said taking-off and landing target and said flying object based on said recognized target mark image, calculates an altitude of said flying object by comparing the size of said recognized target mark image and said recognition pattern, and controls taking-off and landing operations of said flying object based on a result of the calculation.

2. An automatic taking-off and landing system according to claim 1, wherein said control unit obtains a reference position of said target mark through image processing of said target mark taken by said image pickup device and guides taking-off and landing operations of said flying object based on a relation between the reference position of said target mark and a reference position of said flying object.

3. An automatic taking-off and landing system according to claim 1, wherein a GPS device is provided on said flying object, said taking-off and landing target is disposed at a known position, said control unit determines a positional relation between a position of said flying object and a position of said taking-off and landing target based on a position of said flying object acquired by said GPS device and on said known position and controls the flight, and said control unit determines a reference position of said target mark through image processing of an image of a target mark taken by said image pickup device, and controls the taking-off and landing operation of said flying object based on a relation between the reference position of said target mark and a reference position of said flying object.

4. An automatic taking-off and landing system according to claim 1 or claim 2 or claim 3, wherein said taking-off and landing target has light-emitting means.

5. An automatic taking-off and landing system according to claim 1, wherein said control unit recognizes said target mark image based on said recognition pattern from the image taken by said image pickup device and guides said flying object so that the center of said target mark image will be the center of said image on the image.

6. An automatic taking-off and landing system according to claim 1, wherein a GPS device is provided on said flying object, said taking-off and landing target is disposed at a known position, said control unit determines a positional relation between a position of said flying object and a position of said taking-off and landing target based on a position of said flying object acquired by said GPS device and on said known position and controls the flight.

7. An automatic taking-off and landing system according to claim 1, wherein a first GPS device is provided on said flying object, a second GPS device is provided on said taking-off and landing target, and said control unit determines a positional relation between a position of said flying object and a position of said taking-off and landing target based on a position of said flying object acquired by said first GPS device and on a position acquired by said second GPS device and controls the flight.

8. An automatic taking-off and landing system according to claim 7, wherein said taking-off and landing target is provided on a mobile object, said flying object has a first communication unit, said mobile object has a second communication unit, said second communication unit can transmit positional information acquired by said second GPS device to said control unit via said first communication unit, said control unit controls flight of said flying object based on a position acquired by said first GPS device and on a position acquired by said second GPS device so that said flying object tracks the track of said mobile object.

9. An automatic taking-off and landing system according to claim 2 or claim 3, wherein said target mark has similar patterns disposed at concentric multiple positions, the size of each pattern being already known, and at least one pattern can be recognized from an image acquired by said image pickup device in a process when said flying object lands on said taking-off and landing target.

10. An automatic taking-off and landing system according to claim 1, wherein said taking-off and landing target is provided on a mobile object.

11. An automatic taking-off and landing system according to claim 1, wherein said taking-off and landing target is provided on a mobile object, said control unit determines a reference position of a target mark at real time through image processing of an image of said target mark taken by said image pickup device and controls flight of said flying object based on a relation between the reference position of said target mark and a reference position of said flying object so that said flying object tracks said mobile object.

12. An automatic taking-off and landing system according to claim 1, where said target mark has a directional indexing portion to indicate direction, and said control unit corrects the direction of said flying object based on said directional indexing portion.

13. An automatic taking-off and landing system according to claim 1, wherein the shape of said target mark is a circle, said control unit obtains a major axis and a minor axis from the acquired target mark, the deviation and direction of deviation of the flying object with respect to the target mark is calculated by a ratio of said major axis to said minor axis, and the position of said flying object is corrected based on the calculation result.

* * * * *